US006373052B1

(12) United States Patent
Hoyes et al.

(10) Patent No.: US 6,373,052 B1
(45) Date of Patent: Apr. 16, 2002

(54) METHOD AND APPARATUS FOR THE CORRECTION OF MASS ERRORS IN TIME-OF-FLIGHT MASS SPECTROMETRY

(75) Inventors: John B. Hoyes, Stockport; Jonathan C. Cottrell, Altrincham, both of (GB)

(73) Assignee: Micromass Limited, Manchester (GB)

( * ) Notice: Subject to any disclaimer, the term of this patent is extended or adjusted under 35 U.S.C. 154(b) by 0 days.

(21) Appl. No.: 09/381,604

(22) PCT Filed: Jan. 25, 1999

(86) PCT No.: PCT/GB99/00251

§ 371 Date: Sep. 22, 1999

§ 102(e) Date: Sep. 22, 1999

(87) PCT Pub. No.: WO99/38192

PCT Pub. Date: Jul. 29, 1999

(30) Foreign Application Priority Data

Jan. 23, 1998 (GB) ............................................ 9801565

(51) Int. Cl.[7] ........................... B01D 59/44; H01J 49/00
(52) U.S. Cl. ........................................ 250/287; 250/282
(58) Field of Search ................................ 250/282, 287, 250/288

(56) References Cited

U.S. PATENT DOCUMENTS 6,229,142 B1 * 5/2001 Bateman et al. ............ 250/287

FOREIGN PATENT DOCUMENTS

| | | |
|---|---|---|
| GB | 2308227 | 6/1997 |
| WO | WO 98/21742 | 5/1998 |

OTHER PUBLICATIONS

Schiff, Phys Rev, 1936, vol. 50, pp. 88–96.
Donohue and Stern, Rev. Sci. Instrum. 1972, vol. 43, pp. 791–796.
Coates, Rev. Sci Instrum. 1972, vol. 43 No. 12, pp. 1855–1856.
Coates, Journal of Sci. Instrum. Phys. E, 1968, Series 2, vol. 1, pp. 878–879.
Coates, Journal of Sci. Instrum. Phys. E, 1972, vol. 5, pp. 148–150.
Esposite et al. Rev. Sci. Instrum. 1991, vol. 62 (11), pp. 2822–2827.
Coates, Rev., Sci. Instrum. 1992, vol. 63 (3) pp. 2084–2088.
Stephan, Zehnpfenning and Benninghoven, J. of Vac. Sci. Technol. A 1994, vol. 12 (2), pp. 405–410.
Luhmann, T., Rev. Sci. Instrum., vol. 68, No. 6, Jun. 1997, pp. 2347–2356.
Muller, Nuclear Instrum. & Methods 1973, vol. 112, pp. 47–57.
Sabol, Rev. Sci. Instrum. 1988, vol. 59 (9), pp. 2086–2087.
Stephan, Proc. Confr. Soc. Ion Mass Spectrom. SIMS VIIII, Amsterdam, 1991, pp. 115–118.
Muddiman, Nicola, Proctor and, Hercules, Applied Spectrosc. 1996, vol. 50, (2), pp. 161–166.

* cited by examiner

*Primary Examiner*—Bruce Anderson
(74) *Attorney, Agent, or Firm*—Alix, Yale & Ristas, LLP

(57) ABSTRACT

A method of correcting mass-spectral data acquired using a time-of-flight mass spectrometer (1) is disclosed comprising recognizing in an observed mass spectrum the mass peaks and determining the observed peak area and mass centroid. Then, using a correction table, the observed mass centroid is corrected for the effect of detector dead-time. The correction table is generated using a Monte Carlo simulation.

20 Claims, 3 Drawing Sheets

METHOD AND APPARATUS FOR THE CORRECTION OF MASS ERRORS IN TIME-OF-FLIGHT MASS SPECTROMETRY

CROSS-REFERENCE TO RELATED APPLICATION

This is the U.S. national phase of International Application No. PCT/GB99/00251 filed Jan. 25, 1999.

BACKGROUND OF THE INVENTION

This invention relates to methods and apparatus for correcting errors in the measured mass-to-charge ratios of ions determined by time-of-flight mass spectrometry, especially those due to the dead-time of an ion-counting detector.

In a time-of-flight mass spectrometer, bunches of ions are caused to enter a field-free drift region with essentially the same kinetic energy. In the drift region ions of different mass-to-charge ratios in each bunch travel with different velocities and therefore arrive at an ion detector disposed at the exit of the drift region at different times. Measurement of the ion transit-time therefore determines mass-to-charge ratio of that ion.

Currently, the ion detector most commonly employed in time-of-flight mass spectrometers is a single-ion counting detector which produces an electrical pulse signal in response to an ion impact on its detecting surface. In practice, such a detector may comprise one or more channelplate electron multipliers which produce a bunch of electrons in response to an ion impact. These electrons are collected on one or more collection electrodes which are connected to a charge-sensing discriminator. The discriminator generates an electrical signal in response to the electrons arriving at the collection electrode. The signal produced by the discriminator is used to determine the transit time of the ion which struck the detector, typically by means of a multistop time-to-digital converter which is started as a bunch of ions enters the drift region.

In order to acquire a complete mass spectrum, bunches of ions are repetitively generated from a sample and the transit times (as determined by the time-to-digital converter) of the detected ions are used to produce a histogram of the number of ion arrivals against mass-to-charge ratio. Typically, about 1,000 ion bunches may be analyzed to obtain a complete spectrum during a total time period of a few mS. The chief advantage of this form of time-of-flight mass spectroscopy is therefore that every ion which enters the drift region is in theory detected in contrast with scanning mass analyzers in which only a small proportion of the ions entering the analyzer can be detected in any instant. However, this theoretical advantage is only realised in practice if the ion bunches can be produced very quickly, otherwise a complete mass spectrum may take longer to acquire than it would with a scanning mass analyzer.

Partly for this reason, and also because of the limited mass resolution of prior types of time-of-flight mass spectrometers, time-of-flight mass analyzers have not been extensively used in organic mass spectroscopy until recently, despite their ability to analyze ions of very high mass-to-charge ratios. However, the availability of fast and cheap digital computers which are capable of processing the large quantity of data produced sufficiently quickly, and the development of techniques for improving resolution such as orthogonal acceleration time-of-flight mass spectrometers have resulted in time-of-flight mass spectrometers having become the analyzer of choice for high mass organic molecules.

As explained, in order to obtain maximum advantage from a time-of-flight analyzer in organic applications the ion detector must be capable of very fast operation. Typically, ion arrival times are recorded at 1 nS intervals, but in practice all detectors exhibit a certain dead-time following an ion impact during which the detector cannot respond to another ion impact A typical detector dead-time may be of the order of 5 ns and it is quite likely that during acquisition of a typical spectrum ions will arrive during detector dead-time and will consequently fail to be detected. As discussed below, failure to detect ions has a distorting effect on the resultant mass spectra which can only be avoided by reducing the rate at which ions reach the detector or by applying a dead-time correction. Particularly in the case of organic mass spectrometry, reducing the ion arrival rate is unacceptable for the reasons explained above, so that an effective and practical method of dead-time correction becomes very important.

The correction of dead-time for single-particle detectors or counters was first addressed by Schiff in Phys. Rev, 1936 vol 50 pp 88–96. Schiff assumed that the number of particles arriving at a detector in a given time-interval was governed by Poisson's law and derived analytical expressions which allowed an observed count rate to be corrected once the counter dead-time had been determined. Since then there have been many publications which give expressions for dead-time correction for a variety of different detectors and experimental conditions. Coates (in J. Phys. E, 1968 vol 1 pp 878-, J. Phys. E. vol 5 pp 150- and Rev. Sci. Instrum 1972 vol 43 pp 1855-) and Donohue and Stern in Rev. Sci. Instrum. 1972 vol 43 pp 791-) describe analytical solutions of the problem of reconstructing the time distribution of detectors which have an extendable dead-time (that is, detectors wherein the arrival of a second particle during the dead-time already triggered by the earlier arrival of another particle causes that dead-time to extend).

Esposito et al, in Rev. Sci. Instrum. 1991 vol 62 (11) pp 2822- has extended this analysis to include the situation where more than one particle is expected to be detected in any one measurement cycle and for the more complicated case of detectors with non-extendable dead-times. Coates, in Rev. Sci. Instrum. 1992 vol 63 (3) pp 2084 -, points out that in most practical cases the corrections can be achieved using simpler formulae, and gives as an example a simulated time-of-flight mass spectrum corrected for dead-time distortions using an iterative procedure. Stephan, Zehnpfenning and Benninghoven, in J. Vac. Sci. Technol. A, 1994 vol 12 (2) pp 405- specifically discuss the correction of time-of-flight mass spectra for detector dead-time effects using a procedure similar to those suggested by Esposito et al and Coates et al.

In order to apply these prior methods to data representing a complete time-of-flight mass spectrum, bunches of ions are generated repetitively from a sample and allowed to enter the drift region. The ion transit times are determined and allocated to time channels so that after all the bunches have been generated, each time channel contains a count equivalent to the number of ions which had that particular transit time. The value of the count in each time channel is then corrected using the appropriate equation from the prior publications discussed above. It will be appreciated that the correction applied to the count in each channel is dependent on the counts contained in at least some of the earlier channels so that to correct the entire spectrum it is necessary to apply the correction equations to every channel in sequence. This requires that the raw data is stored to enable the corrections to be carried out before the spectral information can be processed and acquisition of the next spectrum can begin. Because the correction calculations require significant computational time, the correction process will limit the rate at which spectra can be acquired and processed, which as explained may seriously limit the usefulness of time-of-flight analysis for organic mass spectrometry. The only way in which this delay in starting the acquisition of the next spectrum can be avoided is by storing all the raw data in fast memory for subsequent processing, which is an equally unattractive option.

SUMMARY OF THE INVENTION

It is an objective, therefore, of the present invention to provide a method of correcting the distortion of a time-of-flight mass spectrum due to detector dead-time without the need to either store or process the acquired data immediately following acquisition. It is another object of the invention to provide a method of correcting the error in the mass-calibration of time-of-flight mass spectra which sometimes results from detector dead-time and in particular a method which can be applied once the data has been processed.

According to a first aspect of the present invention there is provided a method of correcting mass-spectral data.

In a preferred embodiment a method according to the invention further comprises applying a correction to said observed peak area to obtain a value of said peak area corrected for the effect of detector dead-time, said correction being obtained from said predetermined correction table which additionally comprises peak-area corrections for different values of said distribution function and said observed peak areas.

Further preferably, the predetermined peak-shape function used is a Gaussian function which represents the characteristic shape of a mass peak produced by the time-of-flight mass spectrometer if the detector dead-time was zero.

However, other peak-shape functions may be used.

In a practical spectrometer the peak shape may be different at different masses, so that in a broader aspect the invention may comprise using different peak shape functions selected according to the observed mass centroid.

In further preferred embodiments, time-of-flight data may be acquired and processed without dead-time correction to yield mass-spectral data in the form of ion counts vs transit time (that is, ion intensity vs mass-to-charge ratio). Using conventional mass-spectral data processing algorithms, this data may be further processed to recognize mass peaks and to determine observed mass centroids and peak areas of the peaks of interest. According to the invention, the dead-time correction is applied only to these two numbers, and the raw data representing the peak may be discarded once they have been obtained. A distribution function is then calculated for the mass peak to be corrected using the predetermined peak-shape function.

In the case of a Gaussian peak-shape function, the distribution function may conveniently be the standard deviation, which is related by a simple expression to the instrumental resolution at that particular mass, as explained below. A correction to the observed mass centroid (and optionally the observed peak area) is then obtained from the predetermined correction table for the calculated distribution function and observed mass centroid.

In still further preferred embodiments the correction table comprises a set of "pages", that is, two-dimensional tables, one for each of a plurality of values of the distribution function, each page giving the values of corrections to be applied to the observed mass centroid for particular values of the observed peak area.

Optionally, each page may also give corrections for the observed peak areas stored alongside the corrections for the mass centroid.

It will be appreciated that by using the method of the invention, dead-time corrections can be applied to the mass peaks of interest without the need to store large quantities of data or to apply time consuming dead-time corrections in real time. Conveniently, the correction table can be stored in digital memory while data is being acquired, but it is also within the scope of the invention to apply the dead-time corrections to previously acquired mass spectral data which has been stored only in the form of mass peak intensities vs mass-to-charge ratio. In this respect the method of the invention represents a major advance over prior methods of dead-time correction which require the raw data to have been stored.

The corrections contained in the correction table may be determined by predicting the effect of detector dead-time on a plurality of simulated mass peaks having the specified peak-shape function, for each of a range of values of distribution functions and peak areas. Thus the corrections may be generated by first generating a set of simulated distorted data from data points representing an undistorted peak having the desired peak shape function, mass centroid, and distribution function by considering in turn the effect of a given detector dead-time on each data point which makes up the undistorted peak, thereby constructing a simulated peak distorted by the effects of detector dead-time. Corrections to the mass centroid and peak area of the distorted peak (which represents a peak actually generated by the mass spectrometer) can then be established by comparing the simulated distorted and undistorted peaks. This process must of course be repeated for ranges of peak areas and distribution functions, and for different peak shape functions and detector dead-times, if necessary. Although the generation of the correction table is obviously a time-consuming process, it need only be carried out once in respect of any particular type of instrument and detector.

It will be further appreciated that the invention is not limited to use of a Gaussian peak-shape function, although this is suitable for most practical purposes. Any function appropriate to the spectrometer characteristics may be employed.

Further, in order to provide accurate correction where the shape of the mass peaks changes over the mass range of the spectrometer, different peak shape functions, each with its own correction table, can be used, the appropriate table being selected at correction time according to the observed mass centroid.

According to a second aspect of the invention there is provided a time-of-flight mass spectrometer having improved dead-time correction.

In another embodiment, a spectrometer according to the invention further comprises computational means for correcting at least one of said observed peak areas to obtain a value of said peak area corrected for the effect of detector dead-time, said correction being obtained from said predetermined correction table which additionally comprises peak-area corrections for different values of said distribution function and said observed peak areas.

In a practical spectrometer, each of said computational means comprises one or more digital computers running one or more digital computer programs, and the data comprised in said predetermined correction table is contained in the memory of said computer(s).

In another embodiment, means may be provided for storing the data consisting of the observed peak area and observed peak mass centroid above in computer-readable form (for example, on a disk) and means are provided for reading that stored data at any convenient time and processing it in accordance with the invention.

In still further preferred embodiments the means for generating bunches of ions may comprise either an electrospray or an APCI (Atmospheric Pressure Chemical Ionization) ion source, and the drift region may comprise a reflecting time-of-flight mass analyzer. Further preferably, the time-of-flight mass analyzer may be of the orthogonal acceleration type.

BRIEF DESCRIPTION OF THE DRAWINGS

A preferred embodiment of the invention will now be described, by way of example only, and with reference to the accompanying drawings in which.

DETAILED DESCRIPTION OF THE PREFERRED EMBODIMENTS

Figure 1:
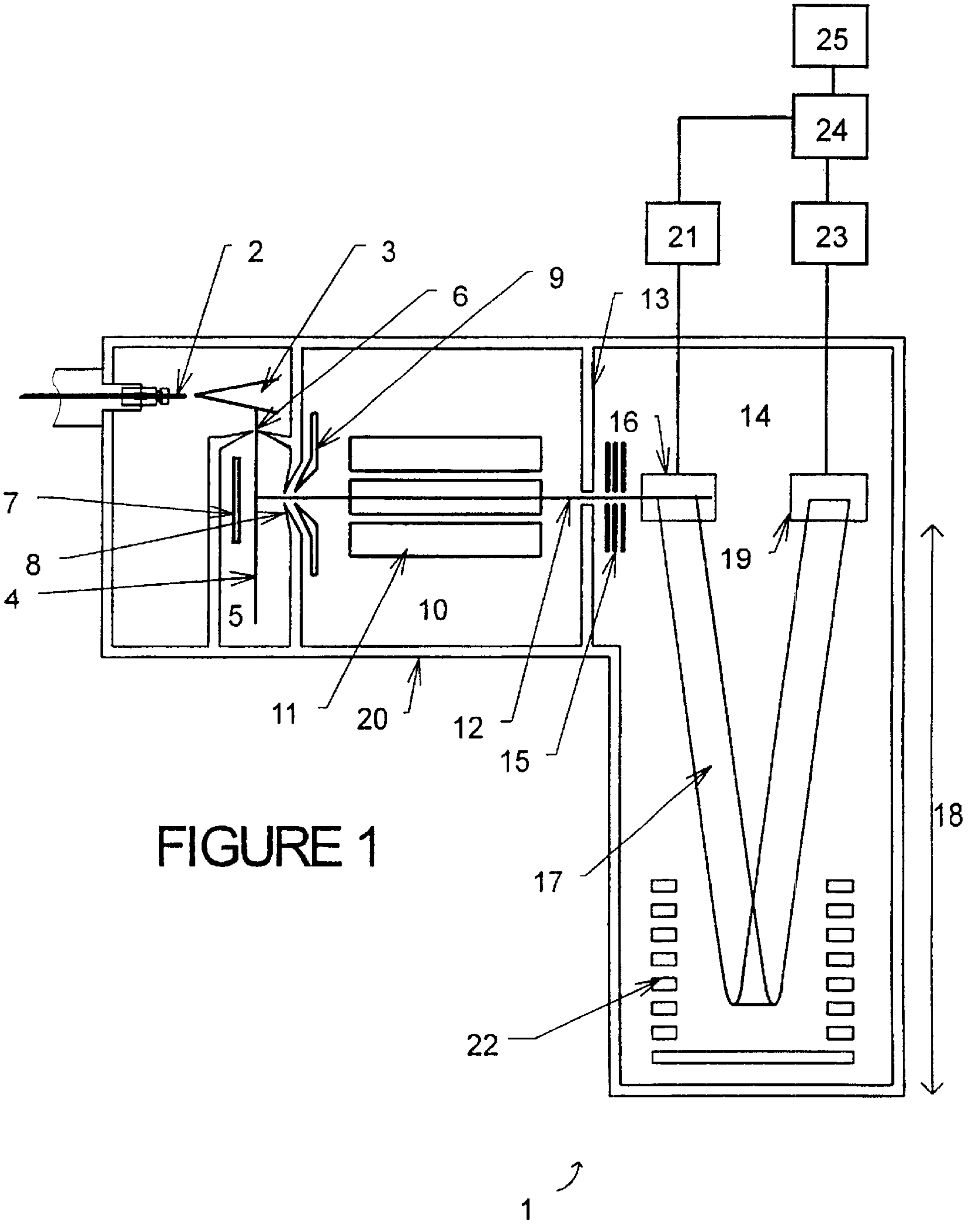
FIG. 1 is a schematic drawing of a time-of-flight mass spectrometer.

In FIG. 1, a time-of-flight mass spectrometer generally indicated by 1 comprises means 1–16 for generating bunches of ions, a drift region 18 and an ion detector 19. A continuous beam of ions is generated by an electrospray ion source which comprises an electrospray nozzle 2 maintained at a high potential relative to a counter electrode 20. An electrospray jet 3 is produced which contains ions characteristic of a sample introduced into the electrospray nozzle 2. Ions are extracted from the jet 3 along an extraction axis 4 and enter a first evacuated chamber 5 through an entrance orifice 6. A suitable potential applied to an extraction electrode 7 disposed in the evacuated chamber 5 causes ions to exit in the form of a continuous ion beam along an analyzer entrance axis 12 and enter a second evacuated chamber 10 through an entrance orifice 8 and an electrostatic focusing lens 9. An ion source of this type is described in more detail in GB patent application 2,308,227.

Ions entering the second evacuated chamber 10 are guided by a RF-hexapole lens assembly 11 which maximizes the ion transmission and additionally may reduce the energy spread of the ions travelling along the analyzer entrance axis 12. The ions then pass through an orifice 13 and an electrostatic focusing lens 15 into an ion pusher 16 disposed in the analyzer chamber 14 which is maintained at a pressure of $10^{-6}$ torr or less. Electrodes in the ion pusher 16 are fed with pulses from a pulse generator 17 in such a way that bunches of ions are repeatedly ejected along a trajectory 17 into the drift region 18. The drift region 18 is configured as a reflecting type analyzer comprising an electrostatic ion mirror 22 which changes the direction of travel of the ions following trajectory 17 and directs them into the ion detector 19. Use of an ion mirror both reduces the size of the spectrometer and improves mass resolution, as is well known, but a linear drift region could be used if desired. The arrangement described for the ion pusher 16 provides an orthogonal acceleration time-of-flight analyzer which further improves resolution and efficiently produces bunches of ions for time-of-flight analysis. However, use of the orthogonal arrangement is not obligatory and a linear arrangement can be adopted, particularly if the ion source used is inherently pulsed, for example a MALDI (matrix assisted laser desorption ionization) source.

The ion detector 19 produces an electrical signal in response to the impact on it of a single ion and comprises two microchannel plates in series and a collector electrode on which electrons released from the plates may impinge. A charge-sensing discriminator 23 produces an electrical signal each time a burst of electrons arrives at the collector electrode of the ion detector 19. This signal causes a clock generator 24 to record an ion arrival time in the memory of a computer 25. The clock generator 24, in response to a "start" signal from the computer 25, also causes the pulse generator 21 to activate the ion pusher 16, and when it does so a start time is recorded in the memory of the computer 25. Ion transit times through the drift region 18 are then calculated by the computer 24 by subtracting the start time from the ion arrival times of the ions comprised in each bunch provided by the ion pusher 16.

In order to acquire a complete mass spectrum, ion bunches are repeatedly produced by the ion pusher 16 and the transit times of the detected ions are stored by the computer 25. The number of ions having each of a plurality of transit times for all the bunches so generated are determined so that a mass spectrum, representable as a histogram of the number of ions having each of the plurality of transit times, is obtained. Each mass spectrum is then processed using conventional mass-spectrographic analysis software (for example, the suite of programs known as Mass Lynx™, available from Micromass UK Ltd) to recognize portions of data in the spectrum which correspond to mass peaks. The software calculates an observed peak area and a mass centroid for each of these peaks, after which the original histogram data is discarded and the spectrum stored simply as a list comprising an observed peak area and a mass centroid for each peak. This data may be stored on disk or even in hard copy form for subsequent correction for dead-time effects as described below, or may be processed immediately.

In practice the data acquired from the ion detector will be distorted by the effects of detector dead-time. In a spectrometer of the type disclosed above, ion count data may be acquired at a 1 ns time resolution while the dead-time of a typical detector may be of the order of 5 ns. Thus in the 5 ns period immediately following an ion impact, no further ion arrivals will be registered. Because the dead-time is primarily due to the charge-sensing discriminator 23 rather than the channelplate making up the detector itself, this dead-time is characteristically of the extending type, that is, a second ion arrival during the dead-time triggered by a first arrival extends the dead-time to 5 ns from the time of the second arrival, and so on. The effect of this on peak areas and mass centroids is to bias the mass centroid of the peak to low mass because the ions with the shortest transit times on the low mass side of the centroid are more likely to be counted than those on the high mass side, the latter being more likely to arrive at the detector during the dead-time initiated by the arrival of a low-mass ion. The observed peak area is also reduced because fewer ions are counted than are actually presented in the peak.

This skewing of the mass centroid is particularly significant when the mass spectrometer is used for accurate mass determination at relatively low resolutions (<5,000), which is an important function for current time-of-flight mass spectrometers used for organic analysis. Although the effect has been commented upon in the prior art, the only method proposed for its correction involves applying to each data point comprised in the peak a calculated correction dependent on the value of earlier data points to reconstruct the entire peak profile and thereby allowing a more accurate mass centroid to be calculated. Even using current high-speed computers, this process is still too slow to be applied without compromising the rate of data acquisition or storing large amounts of raw data. It will be seen from the above description that in a spectrometer according to the invention the raw data is reduced to two figures (a peak area and a mass centroid) for each mass peak before any dead-time correction is applied, which eliminates this problem.

Figure 2:
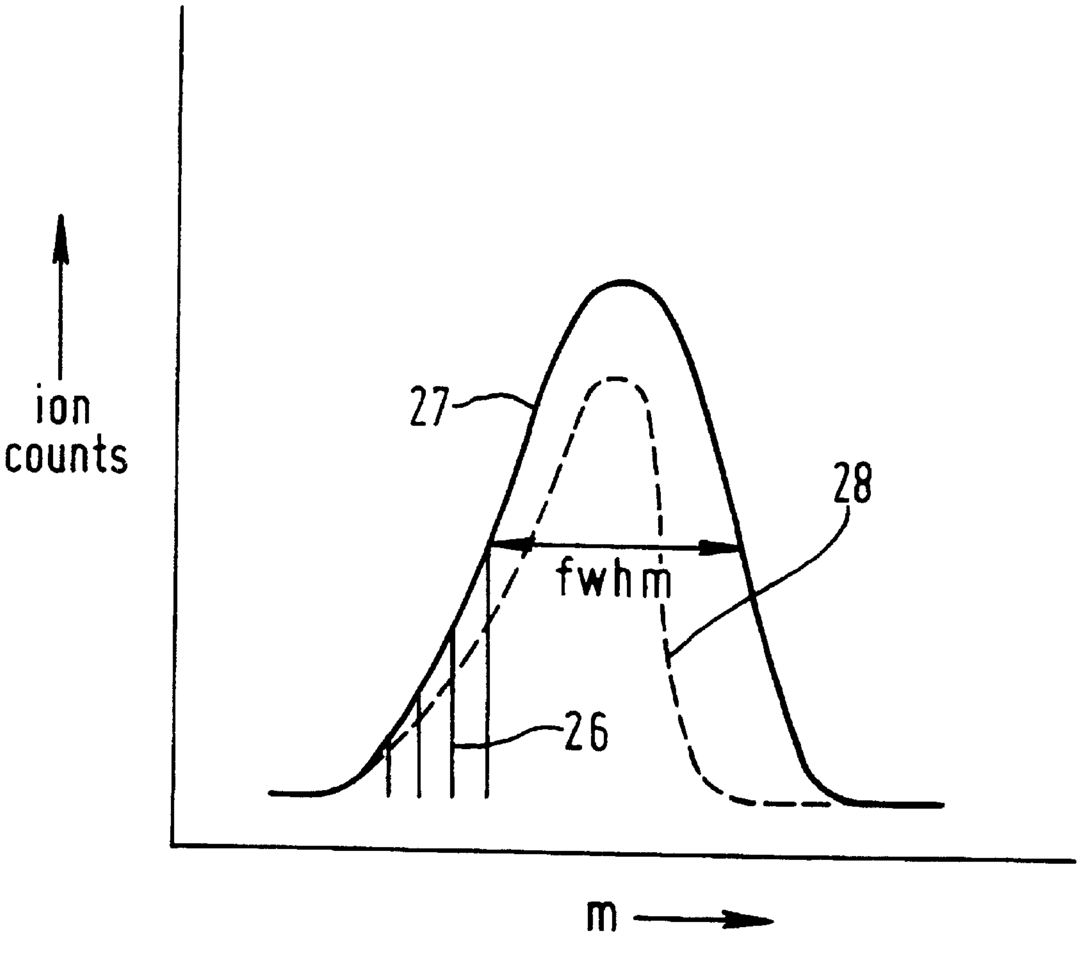
FIG. 2 is a drawing of distorted and undistorted simulated data peaks which illustrate the method of invention.

The method of the invention is dependent on the recognition that in the absence of overlapping mass peaks the shape of a mass peak produced by the spectrometer with a zero dead-time detector can be represented by a predetermined peak-shape function which in a preferred embodiment is a simple Gaussian function (see FIG. 2). For a time-of-flight mass spectrometer, $$(m/z)^{1/2}=At$$

where m/z is the mass-to-charge ratio of an ion which has a transit time t throught the drift region, and A is a calibration constant. For the purposes of the invention it is necessary to derive a distribution function which is characteristic of the peak width at any particular mass (i.e, transit time). Preferably the distribution function is taken as the standard deviation ($\sigma$) of a Gaussian peak, as shown in the following:

For a true Gaussian peak, and assuming for simplicity that z=1, $$\frac{dt}{dM}=\frac{1}{2A\sqrt{M}}$$

$$\delta t=\frac{\delta M}{2A\sqrt{M}}=\frac{M\cdot\delta M}{2A\sqrt{M}}\cdot\frac{1}{M}$$

$$=\frac{\sqrt{M}}{2AR}=fwhm$$

where R is the mass resolution of the spectrometer ($\delta$M/M) and fwhm is the width of the peak at half height i.e, the condition in respect of which R is defined (see FIG. 2).

For a Gaussian peak, $$\sigma=\frac{fwhm}{2.35}=\frac{\sqrt{M}}{4.7AR} \tag{1}$$

From equation (1) it can be seen that a distribution function can easily be determined for each mass peak merely from the observed mass centroid M as the calibration constant A and mass resolution R are known for the instrument.

Figure 3:
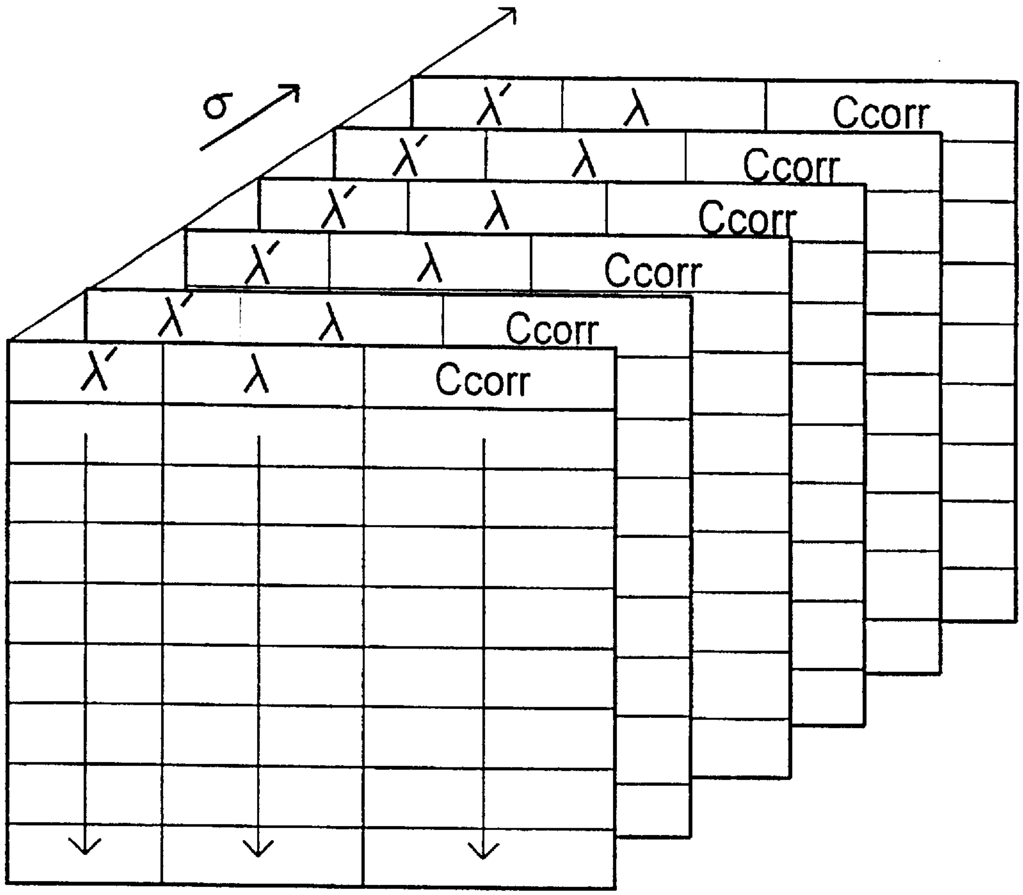
FIG. 3 is a drawing illustrating the structure of a correction table suitable for use in the invention.

Because the peak-shape function is the same for all the mass peaks (i.e, Gaussian), dead-time corrections can be worked out for the case of a particular detector dead-time using simulated data representing a Gaussian peak having the appropriate standard deviation, and values of the corrections to mass centroid and the peak area stored in a correction table having the format shown in FIG. 3. In FIG. 3, $\lambda'$ represents the observed peak area, $\lambda$ the peak area corrected for dead-time effects, and $C_{CORR}$ the correction to be applied to the observed mass centroid. From the correction table, values of the $C_{CORR}$ and $\lambda$ can be obtained from the observed peak area $\lambda$ and the calculated distribution function, (in this case the standard deviation $\sigma$). In fact, because a is proportional to √M (from equation (1)) it is possible to incorporate the values of A and R in the values for $\sigma$ along the o axis in FIG. 3, so that each correction table is associated with a value of the observed mass centroid, obviating the need to calculate o for each peak before obtaining the corrections from the correction table, providing that A and R are both constant and known.

It will be appreciated that although the use of a Gaussian peak-shape function is appropriate for most practical cases, it is possible to use different peak-shape functions and to derive a different distribution function for identifying the actual peak shape. A correction table must of course be constructed using the same peak-shape function. It is also envisaged that different peak-shape functions and their associated correction tables, selected according to the observed mass centroids, may be used if the form of the peaks changes significantly over the mass range of the spectrometer.

As explained, a correction table suitable for use in the invention may be generated from a set of simulated data which represents peaks of the desired peak-shape function with appropriate distribution functions and peak areas. For example, for the case of the undistorted Gaussian peak 27 illustrated in FIG. 2, the peak is first divided into a number of time intervals 26 (conveniently corresponding to the clock pulses of the clock pulse generator 24 in FIG. 1), and an estimate is made of the value each data point would be expected to have in the presence of a given detector dead-time. In this way a simulated distorted peak 28 (FIG. 2) may be constructed and values of $C_{CORR}$ and $\lambda$ (the corrected peak area corresponding to the observed peak area $\lambda'$) can be obtained by comparing the undistorted peak 27 with the distorted peak 28. These values are then stored in the correction table. The process is repeated for simulated peaks over the entire expected range of peak areas so that a "page" of data relevant to a peak of a given distribution function is generated (see FIG. 3). Pages for peaks having other distribution functions are generated by repeating the entire process.

When completed the correction table is stored in computer readable form on a disk or in read-only memory such as an EPROM, and copies of it may then be provided for use with any spectrometer of the type for which the simulations were carried out.

Various methods can be used to estimate the simulated ion counts in the presence of a given detector deadtime. Data may be generated experimentally using an electronic simulator that mimics the behaviour of the detector system, as taught by Esposito, et.al (ibid). More preferably, numerical methods can be employed, as suggested by Coates (Rev. Sci. Instrum., 1992, vol 63 (3) pp 2084-) as a means of testing the correction algorithms taught in that paper. Specifically, a Poisson distribution of ion arrivals may be assumed and a Monte Carlo simulation used to estimate the ion counts at each point on the simulated distorted peak. Thus a preferred numerical method of calculating $\lambda$ and $C_{CORR}$ for given values of $\sigma$ and $\lambda'$ is as follows:

First, a simulated peak having the desired peak shape function (typically a Gaussian Peak) is constructed by calculating predicted ion arrival rates for each of N time slices across the peak, using the equations:

$$rate[t]=e^{-a^2/2}$$

where $$a = \frac{t - N/2}{\sigma}$$

Typically, N=2000.

This data is then normalised such that it represents 1 ion arriving in the peak, i.e., so that:

$$\sum_{0}^{N-1} \text{rate } [t] = 1$$

and multiplied by λ' to obtain a peak shape function representative of a peak for the selected distribution function σ and observed area λ'. The centroid c of this peak is then found using the equation:

$$c = \sum_{0}^{N-1} t \cdot \text{rate}[t]$$

Values of two correction accumulators $sum_0$ and $sum_1$ are set equal to 0 and the following Monte Carlo simulation is used to calculate their values for a peak having distribution function a and observed area λ'. Symbols used in the simulation have the following meanings:

f=the probability that an ion has not yet arrived;

a=the probability of an ion arriving in a given time slice;

$t_{old}$=the time at which the last ion arrived; and deadtime=the known deadtime of the detector system.

For each iteration of the Monte Carlo simulation, the values of f, a and told are initially set as follows:

f=1 (ie, no ion has arrived)

a=0>(a randomly generated number)<1

$t_{old}$=−2×deadtime (to ensure that the detector is live at the start)=t after the first iteration (see later)

For each value of t in the rate array, f is then recalculated according to:

$$f_{next}=f_{last}\times(1-\text{rate } [t])$$

This equation intuitively reflects the fact that the probability of an ion not having arrived will decrease as t increases.

Each value of f so calculated is compared with a, and if the conditions:

(a) f<a and (b) $t>t_{old}$+deadtime are both met, it is assumed that an ion arrival has occurred and will have been detected, so that $sum_0$ is incremented by 1 and $sum_1$ calculated from the equation:

$$sum_1=sum_{1(last)}+t-c$$

where c is the centroid of the chosen peak, calculated as above.

The values of f, a, and $t_{old}$ are then respectively set to 1, another random number, and t.

Each iteration comprises carrying out the above calculations for each t in the array of rate [t] array, that is, N (typically 2000) sets of calculations). To build up a statistically significant model, modifying the values of $sum_0$ and $sum_1$ after each iteration, the iterations are repeated as many times as available computing time will permit (typically between 5 and $10\times10^6$ times). When the process is complete, values of λ and $C_{CORR}$ for the chosen values of λ and σ are obtained from:

$$\lambda=sum_0/\text{no. of iterations}$$

and $$C_{CORR}=sum_1/sum_0$$

Using a desktop PC with a 200 MHz Pentium processor, the entire process takes approximately 1 hour.

For a typical TOF mass spectrometer according to the invention, approximately 15 values of λ' and 15 values of σ are needed (225 in complete Monte Carlo simulations in all). It therefore is likely to take up to 10 days (225 hours) to compute the necessary lookup table of 225 values. However, by using the method of the invention, this need only be carried out once for a given detector system, and subsequent use of the look-up table so computed allows a statistically rigorous and accurate deadtime correction to be applied to time-of-flight mass spectrometric data and the accuracy of the mass measurement of ions of high mass-to-charge ratio ions to be substantially improved.

What is claimed is:

1. A method of correcting mass-spectral data acquired using a time-of-flight mass spectrometer having a drift region and, located at the exit of said drift region, an ion detector which produces an electrical signal in response to the impact on it of a single ion, said method comprising the steps of:

generating bunches of ions from a sample;

admitting said bunches into said drift region, producing electrical signals in response to the impact on said ion detector of at least one of the ions in at least some of said bunches;

determining the transit times through said drift region of at least some of the ions impacting on said ion detector;

counting the number of ions which have each of a plurality of different transit times;

processing data comprising transit times through said drift region and the number of ions which have each of a plurality of different transit times to produce at last one observed mass spectrum comprising data representing the number of ions having particular transit times;

recognizing in a said observed mass spectrum portions of said data which correspond to mass peaks;

determining from at least one of said portions of data an observed peak area and an observed mass centroid;

using a predetermined peak shape function characteristic of said time-of-flight mass spectrometer and selected according to said observed mass centroid, determining from said observed mass centroid a distribution function indicative of the shape of said mass peak; and applying a correction to said observed mass centroid to obtain a value of said mass centroid corrected for the effect of detector dead-time, said correction being obtained from a predetermined correction table which gives values of said correction for different values of said distribution function and said observed peak areas, said predetermined table having been obtained by predicting the effect of said detector dead-time on each of a plurality of simulated mass peaks having said peak-shape functions for appropriate ranges of said distribution functions and peak areas.

2. A method of correcting mass-spectral data as claimed in claim 1, further comprising the step of applying a correction to said observed peak area to obtain a value of said peak area corrected for the effect of detector dead-time, said correction being obtained from said predetermined correction table which additionally comprises peak-area corrections for different values of said distribution function and said observed peak areas.

3. A method of correcting mass-spectral data as claimed in claim 1, wherein said predetermined peak-shape function is a Gaussian function.

4. A method of correcting mass-spectral data as claimed in claim 3, wherein said distribution function is the standard deviation of said Gaussian function.

5. A method of correcting mass-spectral data according to claim 3, wherein said correction is applied to previously acquired mass-spectral data which has been stored in the form of mass peak intensities vs, mass-to-charge ratio.

6. A method of correcting mass-spectral data as claimed in claim 2, wherein said predetermined peak-shape function is a Gaussian function.

7. A method of correcting mass-spectral data according to claim 2, wherein said correction is applied to previously acquired mass-spectral data which has been stored in the form of mass peak intensities vs. mass-to-charge ratio.

8. A method of correcting mass-spectral data according to claim 1, wherein said correction is applied to previously acquired mass spectral data which has been stored in the form of mass peak intensities vs mass-to-charge ratio.

9. A method as claimed in claim 1, wherein the corrections to said mass centroid stored in said correction table have been previously calculated by the following steps:

(a) for a chosen value of the distribution function $\sigma$ and the observed peak area $\lambda'$ for a simultated Gaussian peak divided into N time slices, constructing an array of ion arrival rates for N values of time (t) according to the equation:

$$\text{rate}[t]=e^{-a^2/2}$$

where:

$$a=\frac{t-N/2}{\sigma}$$

(b) normalising the values in said rate array so that:

$$\sum_{0}^{N-1}\text{rate }[t]=1$$

and multiplying those values by $\lambda'$;

(c) calculating the mass centroid c of the simultated peak so defined using the equation:

$$c=\sum_{0}^{N-1}t\cdot\text{rate}[t]$$

(d) setting variables $sum_0$ and $sum_1$ equal to zero;

(e) setting the value of a variable $t_{old}$ according to: $t_{old}=-2\times\text{deadtime}$;

(f) setting the values of variables f and a respectively to 1 and a randomly generated number between 0 and 1;

(g) for each value of t in the rate [t] array, calculating a new value of f according to:

$$f_{next}=f_{last}\times(1-\text{rate }[t])$$

and if f<a and $t>t_{old}$+detector deadtime, incrementing the variable $sum_0$ by 1 and calculating the variable $sum_1$ using the equation:

$$sum_1=sum_{1(last)}+t-c$$

(h) repeating steps (d)–(g) a large number of times;

(i) calculating a correction factor $C_{CORR}$ for said mass centroid using the equation:

$$C_{CORR}=sum_1/sum_0$$

(j) repeating steps (a)–(i) using a different value of $\sigma$ or a different value of $\lambda'$ to obtain values of $C_{CORR}$ for peaks typical of those produced by said time-of-flight mass spectrometer.

10. A method as claimed in claim 9, wherein in step (i) a corrected value of $\lambda'$ is additionally calculated using the equation:

$$\lambda=sum_0/N.$$

11. A method as claimed in claim 1, wherein the corrections to at least said mass centroid stored in said correction table have been previously calculated by the following steps:

generating a set of simulated distorted data from data points representing an undistorted peak having a desired peak shape function, mass centroid and distribution function by considering in turn the effect of a given detector dead-time on each data point which makes up the undistorted peak; and comparing the simulated distorted data with the data points representing said undistorted peaks.

12. A time-of-flight mass spectrometer comprising:

means for generating bunches of ions from a sample;

means for defining a drift region;

an ion detector which produces an electrical signal in response to the impact on it of a single ion;

means of determining the transit time through said drift region of at least some of the ions so generated which impact on said ion detector;

means for counting the number of ions which have each of a plurality of transit times;

computational means for recognizing in the data comprising the number of ions which have each of a plurality of transit times portions of said data which correspond to mass peaks, and for determining from at least one of said portions of data an observed peak area and an observed peak mass centroid;

said spectrometer further comprising:

computational means for determining a distribution function from said observed mass centroid using a predetermined peak-shape function characteristic of said spectrometer which is selected according to said mass centroid; and computational means for applying a correction to said observed mass centroid to obtain a value of said mass centroid corrected for the effect of detector dead-time, said correction being obtained from a predetermined correction table which gives values of said correction for different values of said distribution function and said observed peak areas, said predetermined correction table having been obtained by predicting the effect of said detector dead-time on each of a plurality of simulated mass peaks having said peak-shape functions for appropriate ranges of said distribution functions and peak areas.

13. A time-of-flight mass spectrometer as claimed in claim 12, further comprising computational means for correcting at least one of said observed peak areas to obtain a value of said peak area corrected for the effect of detector dead-time, said correction being obtained from said predetermined correction table which additionally comprises peak-area corrections for different values of said distribution function and said observed peak areas.

14. A time-of-flight mass spectrometer as claimed in claim 13, wherein the drift region comprises a reflecting time-of-flight mass analyzer.

15. A time-of-flight mass spectrometer as claimed in claim 13, wherein the means for generating bunches of ions comprises either an electrospray or an atmospheric pressure chemical ionization ion source.

16. A time-of-flight mass spectrometer as claimed in claim 13, wherein the time-of-flight mass spectrometer is of the orthogonal acceleration type.

17. A time-of-flight mass spectrometer as claimed in claim 12, wherein the means for generating bunches of ions comprises either an electrospray or an atmospheric pressure chemical ionization ion source.

18. A time-of-flight mass spectrometer as claimed in claim 17, wherein the drift region comprises a reflecting time-of-flight mass analyzer.

19. A time-of-flight mass spectrometer as claimed in claim 17, wherein the time-of-flight mass spectrometer is of the orthogonal acceleration type.

20. A time-of-flight mass spectrometer as claimed in claim 12, wherein the time-of-flight mass spectrometer is of the orthogonal acceleration type.

* * * * *